UNITED STATES PATENT OFFICE 2,187,446

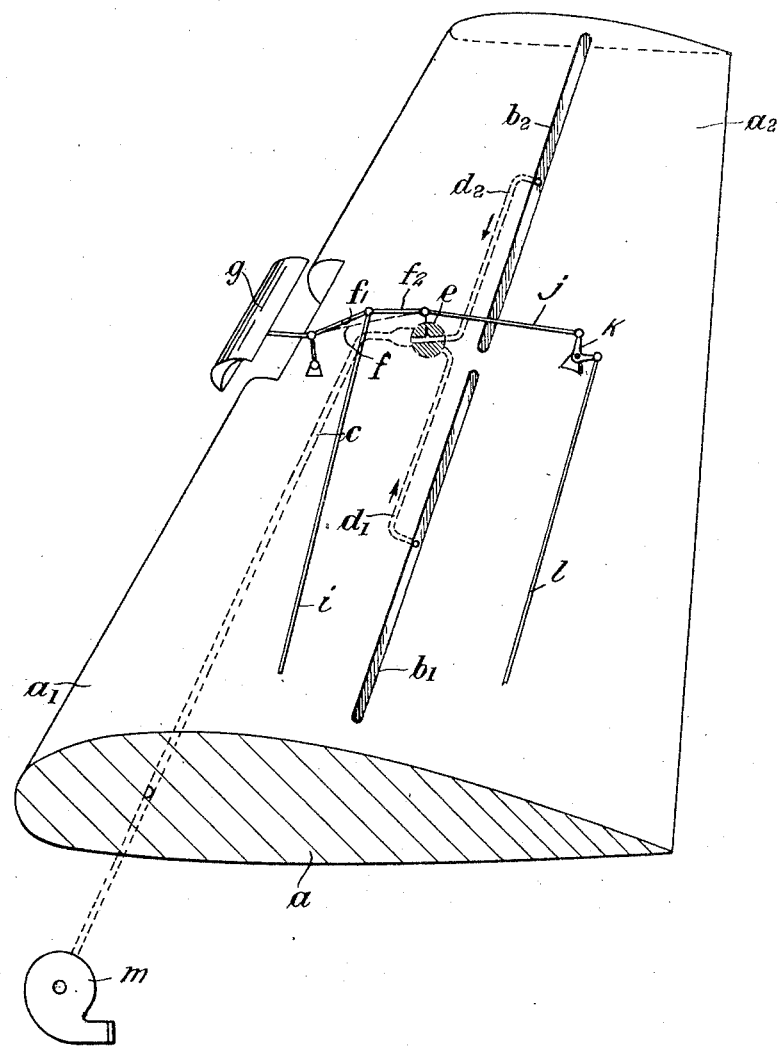

DEFLECTION-PREVENTING ARRANGEMENT IN AIRPLANES

Rudolf Busselmeier, Berlin, Germany, assignor to Bayerische Flugzeugwerke A. G., Augsburg, Germany, a German company Application September 20, 1938, Serial No. 230,877
In Germany September 20, 1937

5 Claims. (Cl. 244—40)

The present invention relates to an airplane wing of the type showing a relatively thick profile in the inner portion of the span and a relatively thin wing profile in the range of the wing tip. The applicant has previously suggested to divide the arrangements for sucking off the boundary layer in such a manner that during fast flying the boundary layer is only sucked off in the wing portion provided with a thick wing profile, whereas in slow flight, that is to say in the condition of stalled flight, the boundary layer is only sucked off at the outer portions of the wings. In the latter case the sucking-off serves less for decreasing the drag than for increasing the lift by increasing the angle of incidence permissible without deflection of the flow, whereas in fast flying the otherwise considerable drag of the thick profiled wing portion is substantially reduced.

The present invention has for its object to provide simple and effective arrangements for rendering the control of the sucking-off entirely independent of human influences. This is important because failure to switch over the sucking-off to the outer wing portions in landing may lead to grave consequences.

According to the invention the switching-over from the inner to the outer wing portion and vice versa is effected by a device responsive to alteration of the angle of incidence, for example a leading aileron or slotted surface. The switching-over is effected by the leading aileron or the like operating a distributor valve in such a manner that when the leading aileron is pulled out, the sucking-off is effected in the outer portions of the wings, whereas when pulled-in the distributor valve is turned to a position assuring the sucking-off in the inner portion of the span.

It is relatively unimportant, whether leading ailerons of the usual span are employed. It is advantageous, however, to use only a single leading aileron of small size, since even a combination of a long leading aileron with a sucking-off device, although still falling within the scope of the invention, is believed to give only a slight additional increase of the maximum angle of incidence permissible. Furthermore, larger leading ailerons involve an undesired increase of the drag. Apart from this the control by a single leading aileron has the advantage that the sucking off of the boundary layer on both wing sides, i. e., the right-hand side and the left-hand side is positively controlled simultaneously; if one or other leading aileron is pulled out somewhat later or earlier, this will thus be without detrimental effect and not result in undesired rolling torques.

In order that the invention may be readily understood, a constructional example of the invention is illustrated in the drawing which shows a perspective fractional view of an airplane wing.

Referring now to the single figure of the drawing, a wing $a$ has an inner section $a_1$ and an outer section $a_2$. In the inner wing section a sucking-off slot $b_1$ is provided, whereas in the range of the wing tip the wing is provided with another sucking-off slot $b_2$. A sucking-off pipe $c$ leads to the sucking-off pump indicated at $m$, and sucking-off pipes $d_1$ and $d_2$ connect with the associated sucking-off slots $b_1$ and $b_2$ respectively, and with the valve $e$ which enables one or the other of these two sucking-off pipes $d_1$, $d_2$ to be selectively put in conductive communication with the sucking-off pipe $c$. By means of a linkage $f$ or the like, the valve $e$ is connected with the small leading aileron $g$, in such a manner that in the pulled-out condition of the leading aileron $g$, i. e., in the condition of stalled flight, the sucking-off is effected through the slot $b_2$, whereas with the leading aileron $g$ pulled-in the pipe $c$ is connected with the pipe $d_1$ and thus with the inwardly disposed sucking-off slot $b_1$. Provision may, of course, also be made for enabling the linkage $f$ to be rendered inoperative, in which case the valve $e$ may be operated manually. This possibility is particularly provided as a safety measure in case the leading aileron $g$ should fail for any reason.

For this purpose the link $f$ may consist of two pivoted toggle elements $f_1$ and $f_2$ whose relative pivotal movement is restricted and which are normally held in the nearly stretched position by means of a laterally flexible push rod $i$. It will be seen that when the rod $i$ is in the position as shown, it maintains the toggle elements $f_1$ and $f_2$ in the illustrated relative position while not interfering with their longitudinal movement, and that therefore under this condition any movement of the slot $g$ will involve corresponding operation of the valve $e$. When, however, the rod $i$ is pulled back, movement of the slat $g$ will only produce pivotal movement of the toggle elements $f_1$ and $f_2$ without operating the valve $e$. The valve $e$ may then be manually operated in any suitable manner, for example by means of a linkage $j$, $k$, $l$, as illustrated.

Having now described my invention, what I claim as new and desire to secure by Letters Patent is:

1. In an airplane wing having inner wing sections of relatively thick profile, and outer wing sections of relatively thin profile, in combination, a distributor valve device, at least one passage leading from said distributor valve device to the surface of said sections of relatively thick profile, at least one further passage leading from said distributor-valve device to the surface of said sections of relatively thin profile, suction producing means, a main suction passage connecting said suction producing means with said distributor valve device, a control device responsive to alteration of the angle of incidence of the airplane wing, and connecting means for operatively connecting said control device with said distributor-valve device, the connection being such that said distributor valve device is operated to connect said main passage with said passages when the angle of incidence is smaller, and to connect said main passage with said further passages when the angle of incidence is greater than a predetermined value.

2. An arrangement as claimed in claim 1, in which said control device is a leading aileron.

3. An arrangement as claimed in claim 1, in which said control device is a single small leading aileron, and said distributor valve device is so connected with said leading aileron that when the leading aileron is in its normal position, the suction producing means is connected with said passages, and when the leading aileron is pulled out, the sucking-off is effected through said further openings.

4. An arrangement as claimed in claim 1, in which said responsive device is a leading aileron, the arrangement further comprising a linkage connecting said leading aileron with said distributor valve device, a clutch member in said linkage for rendering the linkage inoperative, and means for manually operating said distributor valve device.

5. An arrangement as claimed in claim 1, further comprising a device for the arbitrary manual operation of said distributor valve device.

RUDOLF BUSSELMEIER.